United States Patent
Stokes, Jr.

(10) Patent No.: US 11,007,697 B1
(45) Date of Patent: May 18, 2021

(54) COMPOSITE EXTRUDED PRODUCTS AND SYSTEMS FOR MANUFACTURING THE SAME

(71) Applicant: Green Bay Decking, LLC, Green Bay, WI (US)

(72) Inventor: William Rozier Stokes, Jr., Piedmont, SC (US)

(73) Assignee: Green Bay Decking, LLC, Green Bay, WI (US)

( * ) Notice: Subject to any disclaimer, the term of this patent is extended or adjusted under 35 U.S.C. 154(b) by 157 days.

(21) Appl. No.: 16/170,374

(22) Filed: Oct. 25, 2018

Related U.S. Application Data (60) Provisional application No. 62/577,061, filed on Oct. 25, 2017.

(51) Int. Cl.
*B29C 59/04* (2006.01)
*B29C 48/00* (2019.01)
(Continued)

(52) U.S. Cl.
CPC ............ *B29C 48/002* (2019.02); *B29C 48/07* (2019.02); *B29C 48/154* (2019.02);
(Continued)

(58) Field of Classification Search
CPC ..... B29C 48/002; B29C 48/07; B29C 48/914; B29C 48/154; B29C 48/92; B29C 59/046; B29C 59/002; B29C 2948/92209; B29C 2948/92942; B29C 2948/92447; B29C 2948/92704; B29C 48/885; B29C 53/84; B29C 48/911; B29C 48/9135; B29C 48/9145; B29C 48/917; B29C 48/915; B29C 48/9155; B29C 71/025; B29C 48/904; B29C 48/905; B29C 48/906; B29C 59/005; B29L 2031/10; E04H 17/14; B29K 2027/06; E04F 13/18; E04F 15/02183; E04F 15/10
See application file for complete search history.

(56) References Cited

U.S. PATENT DOCUMENTS 2,400,357 A 5/1946 Krajci
2,612,246 A 9/1952 Whitehouse et al.
(Continued)

OTHER PUBLICATIONS

Caulfield et al. "Wood Thermoplastic Composites", Handbook of Wood Chemistry and Wood Composites, CRC Press, 2005, pp. 365-378.

*Primary Examiner* — Leith S Shafi
(74) *Attorney, Agent, or Firm* — Andrus Intellectual Property Law, LLP (57) ABSTRACT

Systems for manufacturing a composite extruded product formed of a substrate and a film. The system includes an extruder, a film application section for integrally bonding the film to the substrate, a heating section for increasing the temperature of the composite extruded product, an embosser for embossing a pattern into the composite extruded product, and a cooling section for cooling the composite extruded product. The cooling section applies pressure to the composite extruded product and sprays cooling fluid onto the composite extruded product such that the composite extruded product is cooled and the pattern embossed into the first surface is permanently set.

7 Claims, 7 Drawing Sheets

(51) Int. Cl.
  *B29C 59/00* (2006.01)
  *B29C 48/07* (2019.01)
  *B29C 48/92* (2019.01)
  *B29C 48/154* (2019.01)
  *B29C 48/88* (2019.01)
  *E04H 17/14* (2006.01)
  *B29L 31/10* (2006.01)
  *B29K 27/06* (2006.01)
  *E04F 15/02* (2006.01)
  *E04F 15/10* (2006.01)
  *E04F 13/18* (2006.01)

(52) U.S. Cl.
  CPC ............ *B29C 48/914* (2019.02); *B29C 48/92* (2019.02); *B29C 59/002* (2013.01); *B29C 59/046* (2013.01); *B29C 2948/92209* (2019.02); *B29C 2948/92447* (2019.02); *B29C 2948/92704* (2019.02); *B29C 2948/92942* (2019.02); *B29K 2027/06* (2013.01); *B29L 2031/10* (2013.01); *E04F 13/18* (2013.01); *E04F 15/02183* (2013.01); *E04F 15/10* (2013.01); *E04H 17/14* (2013.01)

(56) References Cited

U.S. PATENT DOCUMENTS

| | | |
|---|---|---|
| 3,233,382 A | 2/1966 | Graveley |
| 3,367,917 A | 2/1968 | Granito |
| 3,407,154 A | 10/1968 | Casebolt et al. |
| 3,407,155 A | 10/1968 | Casebolt |
| 3,783,570 A | 1/1974 | Storch |
| 3,936,518 A | 2/1976 | Soda et al. |
| 4,141,944 A | 2/1979 | Anstadt et al. |
| 4,159,920 A | 7/1979 | Andersson et al. |
| 4,262,464 A | 4/1981 | Ludowici |
| 4,282,119 A | 8/1981 | Tinkelenberg et al. |
| 4,362,827 A | 12/1982 | Tinkelenberg et al. |
| 4,631,215 A * | 12/1986 | Welygan ............. B29D 16/00 428/105 |
| 4,680,911 A | 7/1987 | Davis et al. |
| 4,737,532 A | 4/1988 | Fujita et al. |
| 4,925,512 A | 5/1990 | Briand |
| 4,955,169 A | 9/1990 | Shisko |
| 5,053,176 A | 10/1991 | Cameron et al. |
| 5,082,605 A | 1/1992 | Brooks et al. |
| 5,088,910 A | 2/1992 | Goforth et al. |
| 5,096,046 A | 3/1992 | Goforth et al. |
| 5,249,402 A | 10/1993 | Crick et al. |
| 5,314,325 A | 5/1994 | Bosler |
| 5,332,602 A | 7/1994 | Barre et al. |
| 5,344,700 A | 9/1994 | McGath et al. |
| 5,373,678 A | 12/1994 | Hesser |
| 5,378,381 A | 1/1995 | Takahashi |
| 5,406,768 A | 4/1995 | Giuseppe et al. |
| 5,465,547 A | 11/1995 | Jakel |
| 5,474,722 A | 12/1995 | Woodhams |
| 5,480,602 A | 1/1996 | Nagaich |
| 5,519,971 A | 5/1996 | Ramirez |
| 5,730,371 A | 3/1998 | Dongieux, Jr. et al. |
| 5,736,218 A | 4/1998 | Iwata et al. |
| 5,842,314 A | 12/1998 | Porter |
| 5,847,016 A | 12/1998 | Cope |
| 5,851,469 A | 12/1998 | Muller et al. |
| 5,866,054 A | 2/1999 | Dorchester et al. |
| 5,869,176 A | 2/1999 | Dorchester et al. |
| 5,906,840 A | 5/1999 | Bosler et al. |
| 5,908,496 A | 6/1999 | Singule et al. |
| 5,950,389 A | 9/1999 | Porter |
| 6,265,037 B1 | 7/2001 | Godavarti et al. |
| 6,309,492 B1 | 10/2001 | Seidner |
| 6,344,268 B1 | 2/2002 | Stucky et al. |
| 6,418,610 B2 | 7/2002 | Lubker, II et al. |
| 6,497,937 B1 | 12/2002 | Lam et al. |
| 6,564,521 B1 | 5/2003 | Brown et al. |
| 6,579,605 B2 | 6/2003 | Zehner |
| 6,586,503 B1 | 7/2003 | Grohman |
| 6,620,354 B1 * | 9/2003 | Bessemer ............. B29C 48/276 264/40.6 |
| 6,641,384 B2 | 11/2003 | Bosler et al. |
| 6,663,733 B2 | 12/2003 | Nagaya et al. |
| 6,692,815 B2 | 2/2004 | Edgman |
| 6,737,006 B2 | 5/2004 | Grohman |
| 6,758,996 B2 | 7/2004 | Monovoukas et al. |
| 6,823,794 B2 | 11/2004 | Bosler et al. |
| 6,841,239 B2 | 1/2005 | Hasegawa |
| 7,127,869 B2 | 10/2006 | Perry |
| 7,325,325 B2 | 2/2008 | Gleeson |
| 7,748,181 B1 | 7/2010 | Guinn |
| 8,020,353 B2 | 9/2011 | Gaudreau |
| D663,047 S | 7/2012 | Shaw et al. |
| 8,407,962 B2 | 4/2013 | Cahill et al. |
| 8,516,765 B2 | 8/2013 | Shaw et al. |
| 8,756,891 B2 | 6/2014 | Wilson et al. |
| 8,795,813 B2 | 8/2014 | Olvey |
| 8,955,281 B2 | 2/2015 | Pietruczynik et al. |
| 9,097,024 B2 | 8/2015 | Culpepper |
| 9,109,363 B2 | 8/2015 | Grau |
| 9,162,369 B2 | 10/2015 | Verville et al. |
| 9,309,678 B1 | 4/2016 | Mollinger et al. |
| 2003/0056458 A1 | 3/2003 | Black et al. |
| 2004/0112465 A1 | 6/2004 | Jones |
| 2004/0211144 A1 | 10/2004 | Stanchfield |
| 2005/0053767 A1 | 3/2005 | Franco et al. |
| 2005/0127345 A1 | 6/2005 | Giacchino |
| 2005/0170147 A1 | 8/2005 | Bacon et al. |
| 2006/0173105 A1 | 8/2006 | Griffin et al. |
| 2007/0001333 A1 * | 1/2007 | Dias ............. B29C 48/92 264/40.6 |
| 2007/0003747 A1 | 1/2007 | Gnatowski et al. |
| 2007/0104930 A1 | 5/2007 | Grohman |
| 2007/0289232 A1 | 12/2007 | Crostic |
| 2008/0010924 A1 | 1/2008 | Pietruczynik et al. |
| 2009/0019814 A1 | 1/2009 | Gleeson et al. |
| 2009/0134534 A1 * | 5/2009 | Koivukunnas ........ B29C 59/026 264/1.33 |
| 2009/0241459 A1 | 10/2009 | Bryan |
| 2009/0283201 A1 | 11/2009 | Black et al. |
| 2009/0286044 A1 | 11/2009 | Crostic, Jr. |
| 2011/0203724 A1 * | 8/2011 | Stokes, Jr. ............. B32B 27/12 156/221 |

* cited by examiner

COMPOSITE EXTRUDED PRODUCTS AND SYSTEMS FOR MANUFACTURING THE SAME

CROSS-REFERENCE TO RELATED APPLICATION

The present application is based on and claims priority to U.S. Provisional Patent Application No. 62/577,061 filed Oct. 25, 2017, the disclosure of which is incorporated herein by reference.

FIELD

The present disclosure relates to composite extruded products and systems for manufacturing composite extruded products.

BACKGROUND

Composite extruded products, e.g. decking, siding panels, and wall siding systems, can be made from several different composite materials including wood, plastic or vinyl materials such as polyvinyl chloride (PVC), and engineered wood composites. The composite extruded products may also include additives that add color and/or protect the composite extruded products against decay, mildew, ultraviolet light exposure, discoloration, and/or the like.

The composite extruded products may be made from layers of materials. For example, the composite extruded products may include a substrate layer and a cap layer that is affixed to the substrate layer. The cap layer is relatively thin relative to the substrate layer, and the expensive materials of the composite extruded product can be located in the thin cap layer rather than the relatively thick substrate layer to reduce the overall cost of the composite extruded product, e.g. expensive additives are only included in the thin cap layer and are not included in the thick substrate layer.

The composite extruded products may also be embossed by embossing rollers such that the surfaces of the composite extruded products are embossed with patterns. The embossed patterns can vary, and in certain examples, the embossed patterns simulate or mimic wood grain patterns of real wood. As such, the composite extruded products appear to be real wood to the consumer.

The following U.S. Patent Application Publication is incorporated herein by reference in entirety: U.S. Patent Application Publication No. 2011/0203724 which discloses conventional methods for making a conventional composite extruded product.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, systems for manufacturing an embossed composite extruded product formed of a substrate and a film are disclosed. In one example, the system contemplates obtaining a substrate formed of a composite material and having a top surface, a bottom surface, and opposing side surfaces and providing the substrate to a film application section. In certain examples, an extruder is configured to continuously extrude and convey the substrate downstream to the film application section. The film application section receives the substrate and applies a film to the substrate such that the film is integrally bonded with at least the top surface of the substrate. The substrate and the film form a composite extruded product and the composite extruded product thus formed has a first embossing surface that is at least one of the top surface, the bottom surface, and the side surfaces of the substrate and the integrally bonded film. In certain examples, the film application section has a plurality of rollers that press the film onto at least one of the top surface, the bottom surface, and the side surface of the substrate. The film application section may also include a first heater that heats the one of the top surface, the bottom surface, and at least one side surface of the substrate before one roller of the plurality of rollers presses the film thereon. At least one concentrated heater, e.g. second heater, may also be incorporated that heats or reheats another of the top surface, the bottom surface, and another of the side surfaces before another roller of the plurality of rollers presses the film thereon. The system may also include a heated roller positioned upstream of the film application section for heating the film such that the film is malleable when the film application section applies the film to the substrate.

At least one heating section is integrated into the system downstream of the film application section. The heating section receives the composite extruded product that includes the film after film application and increases a temperature of the composite extruded product to an embossing temperature. At least one embossing section receives the composite extruded product from one heating section and embosses a pattern into the first embossing surface to provide an embossed composite extruded product. In certain examples of the system, two or more heating and embossing sections are contemplated such that the composite extruded product is heated at a first heating section, pre-embossed (if necessary for the finished embossed pattern) as a first embossing section, heated at a second heating section and then embossed a second time at a primary or second embossing section. Additional heating and embossing sections may be incorporated into the system, with the only limitation being the desired number of embossments for a given composite extruded product. After embossing is completed, a cooling section receives the embossed composite extruded product, applies pressure to the embossed composite extruded product, and sprays cooling fluid onto the embossed composite extruded product. This results in the embossed composite extruded product being cooled to a cooled temperature that is less than the embossing temperature and permanently setting the pattern embossed into the primary or first embossing surface.

In other examples, the cooling section includes at least one cooling section sensor, at least one cooling roller for applying pressure to the embossed composite extruded product, and at least one nozzle for spraying cooling fluid onto the embossed composite extruded product. The cooling section, in certain examples, may have a plurality of cooling rollers that apply pressure to the composite extruded product to maintain the composite extruded product at a desired shape as the composite extruded product is cooled to the cooled temperature. The cooling section may also have a plurality of nozzles that spray the cooling fluid onto the embossing surface of the composite extruded product to cool the composite extruded product as the plurality of pressure rollers applies pressure to the embossed composite extruded product.

In certain examples, a controller is in communication with at least one temperature sensor for sensing the temperature of the composite extruded product upstream of each heating section. The temperature sensor upstream of a heating section provides feedback to the controller to control each heating section to apply an appropriate amount of heat such that the composite extruded product is heated to the embossing temperature. When the cooling section includes at least one cooling section sensor, at least one cooling roller for applying pressure to the embossed composite extruded product, and at least one nozzle for spraying cooling fluid onto the embossed composite extruded product, the controller may be configured to be in communication with each cooling section sensor, each cooling roller, and each nozzle to receive feedback from each cooling section sensor to control each nozzle to spray the cooling fluid onto the embossed composite extruded product and decrease the temperature of the embossed composite extruded product to a cooled temperature that is less than the embossing temperature and to control each cooling roller to apply pressure to the composite extruded product to maintain a desired shape of the composite extruded product.

In certain examples, the composite extruded product has a second embossing surface comprising the substrate and the integrally bonded film located opposite or transverse to the first embossing surface. In this instance, at least one nozzle of the plurality of nozzles sprays cooling fluid onto the second embossing surface.

In another example, a system for manufacturing an embossed composite extruded product formed of a substrate and a film includes an extruder configured to continuously extrude and convey the substrate downstream within the system and forms a substrate having a top surface, a bottom surface, and opposing side surfaces from a composite material. A film application section subsequently receives the substrate from the extruder and applies a film to the substrate such that the film is integrally bonded with the substrate. The substrate and the film form a composite extruded product having a first embossing surface comprising the substrate and the integrally bonded film. In certain examples, the film application section further comprises at least one heated roller for heating the film before the film is applied to the substrate and a first temperature sensor for sensing temperature of the film. In this instance, the first temperature sensor provides feedback to a controller to control the heated roller to apply an appropriate amount of heat to the film such that the film is heated to a first preheat temperature. The film application section may further include a heater for heating the substrate before the film is applied to the substrate and a second temperature sensor for sensing temperature of the substrate. Here, the second temperature sensor provides feedback to the controller to control the heater to apply an appropriate amount of heat to the substrate such that the substrate is heated to a second preheat temperature. The first preheat temperature is preferably more than the second preheat temperature, and in certain examples, the first preheat temperature is between 275° F. and 325° F. and the second preheat temperature is between 250° F. and 275° F.

The system then may incorporate a heating section that receives the composite extruded product from the film application section. Multiple heating sections may be incorporated, as disclosed herein, and each heating section has at least one sensor for sensing temperature of the composite extruded product received into the heating section and at least one heating element for heating the composite extruded product to an embossing temperature. An embossing section subsequently receives the composite extruded product from a heating section and embosses a pattern into the first embossing surface to create an embossed composite extruded product. Again, multiple embossing sections may be incorporated into the system such that the product may receive multiple and varying embossments. What is important is that each embossing system receives the product from a heating section so that the product is received into the embossing section at the embossing temperature. In certain examples, the embossing temperature is between 250 degrees Fahrenheit (° F.) and 275° F.

A cooling section receives the final embossed composite extruded product from the last embossing section. The cooling section has at least one cooling section sensor for sensing temperature of the embossed composite extruded product received into the cooling section. A first cooling roller is also incorporated for applying a pressure to the embossed composite extruded product, and a first cooling nozzle for spraying cooling fluid onto the embossed composite extruded product is also utilized. The cooling section may have a second cooling roller positioned downstream of the first cooling roller for applying pressure to the composite extruded product. The composite extruded product may have a second embossing surface comprised of the substrate and the integrally bonded film. In this instance, one of the first cooling roller and the second cooling roller contacts the first embossing surface and the other of the first cooling roller and the second cooling roller contacts the second embossing surface. The cooling section, in this instance, will have a second nozzle, and the system is configured such that the first nozzle sprays the cooling fluid onto the first embossing surface and the second nozzle sprays the cooling fluid onto the second embossing surface.

A controller is in communication with each heating section sensor, each heating element, each cooling section sensor, each cooling roller, and each cooling nozzle. The controller is configured to receive feedback from at least one heating section sensor and control at least one heating element to apply an appropriate amount of heat to the composite extruded product in the heating section to heat the composite extruded product to the embossing temperature. The controller also receives feedback from at least one cooling section sensor to control the first nozzle to spray the cooling fluid onto the embossed composite extruded product and decrease the temperature of the embossed composite extruded product to a cooled temperature that is less than the embossing temperature. The controller further controls the first cooling roller and/or the second cooling roller to apply pressure to the composite extruded product to maintain a desired shape of the composite extruded product. In certain examples, the pressure applied by the second cooling roller is less than the pressure applied by the first cooling roller.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

This application is directed to improvements for conventional extrusion systems and embossing systems to manufacture new composite extruded products that have detailed and multi-dimensional embossing patterns embossed therein. The new composite extruded products better mimic or replicate the wood grain patterns of real wood. The present application also improves and simplifies conventional extrusion and embossing systems and processes to produce improved composite extruded products. Accordingly, the presently disclosed composite extruded products, extrusion systems and processes, and embossing systems and processes provide many advantages over conventional composite extruded products and manufacturing systems.

Figure 1A:
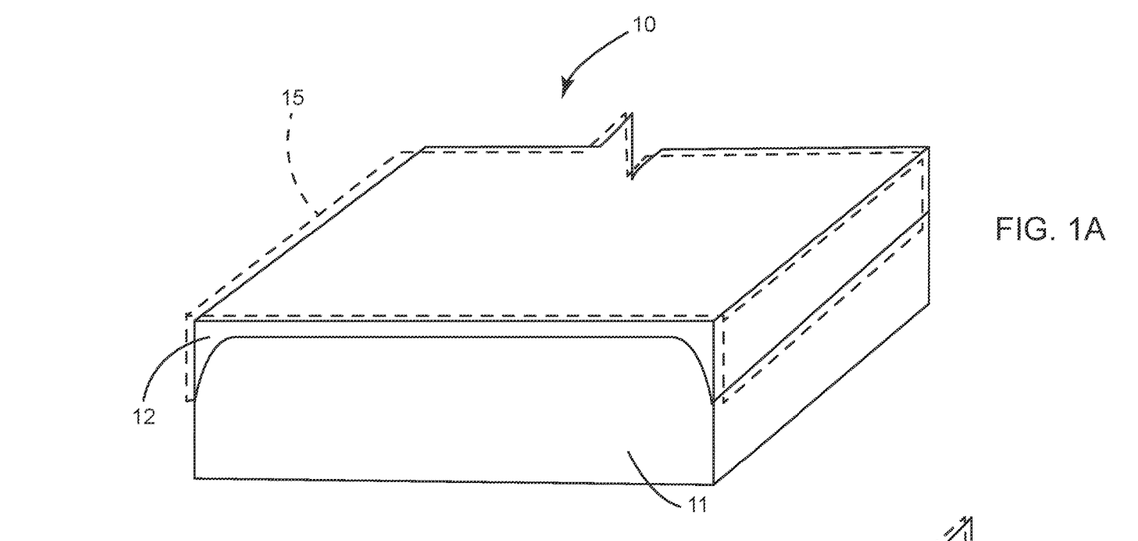
FIGS. 1A-1B are examples of composite extruded product of present disclosure formed via the extrusion and embossing system of the present disclosure.
Figure 1B:
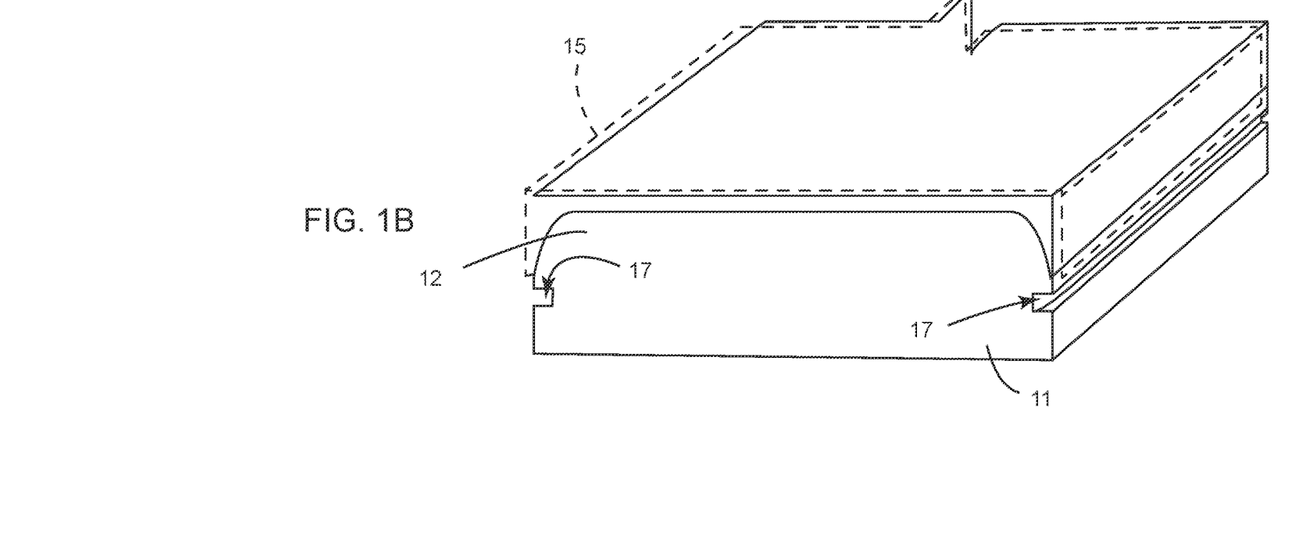

Referring to FIGS. 1A-1B, example composite extruded products 10 of the present disclosure is depicted. The shape and/or size of the composite extruded products 10 will depend on the application of the composite extruded products 10. For example, the composite extruded products 10 may be formed into elongated planks for use in decking application. Other composite extruded products with varying shapes, profiles, cross sections, and/or sizes may be processed and/or manufactured using the systems and processes described herein. In other examples, the composite extruded products 10 are used as siding, flooring, window sills, and fencing. In certain examples (see FIG. 1B), the composite extruded product 10 includes a groove or cutout 17 that extends along the length of the composite extruded product 10. In still other examples, the composite extruded product 10 may include a projection or tongue (not shown) that is slidably received into a corresponding groove or cutout of another adjacent composite extruded product 10. The composite extruded products 10 can be made of any suitable material known the art. For example, the composite extruded products 10 may include wood materials, plastic or vinyl materials such as polyvinyl chloride (PVC), and/or engineered wood composites. The composite extruded products 10 may also include additives such as colorant/pigment and chemicals that protect the composite extruded product 10 from decay, mildew, ultraviolet light exposure, discoloration, and/or the like. In one non-limiting example, the composite extruded product 10 includes a composite material including papermaking sludge and a polymer composition having cellulose and a synthetic polymer resin, which is described in U.S. Pat. No. 6,758,996.

The composite extruded product 10 includes a substrate 11 comprising any number of suitable materials and a cap 12 comprising any number of suitable materials. A person having ordinary skill in the art will recognize that the composite extruded product 10 can have any number of components, layers, and/or sections. In the examples depicted in FIGS. 1-2, the composite extruded product 10 includes the substrate 11 and the cap 12.

Figure 2:
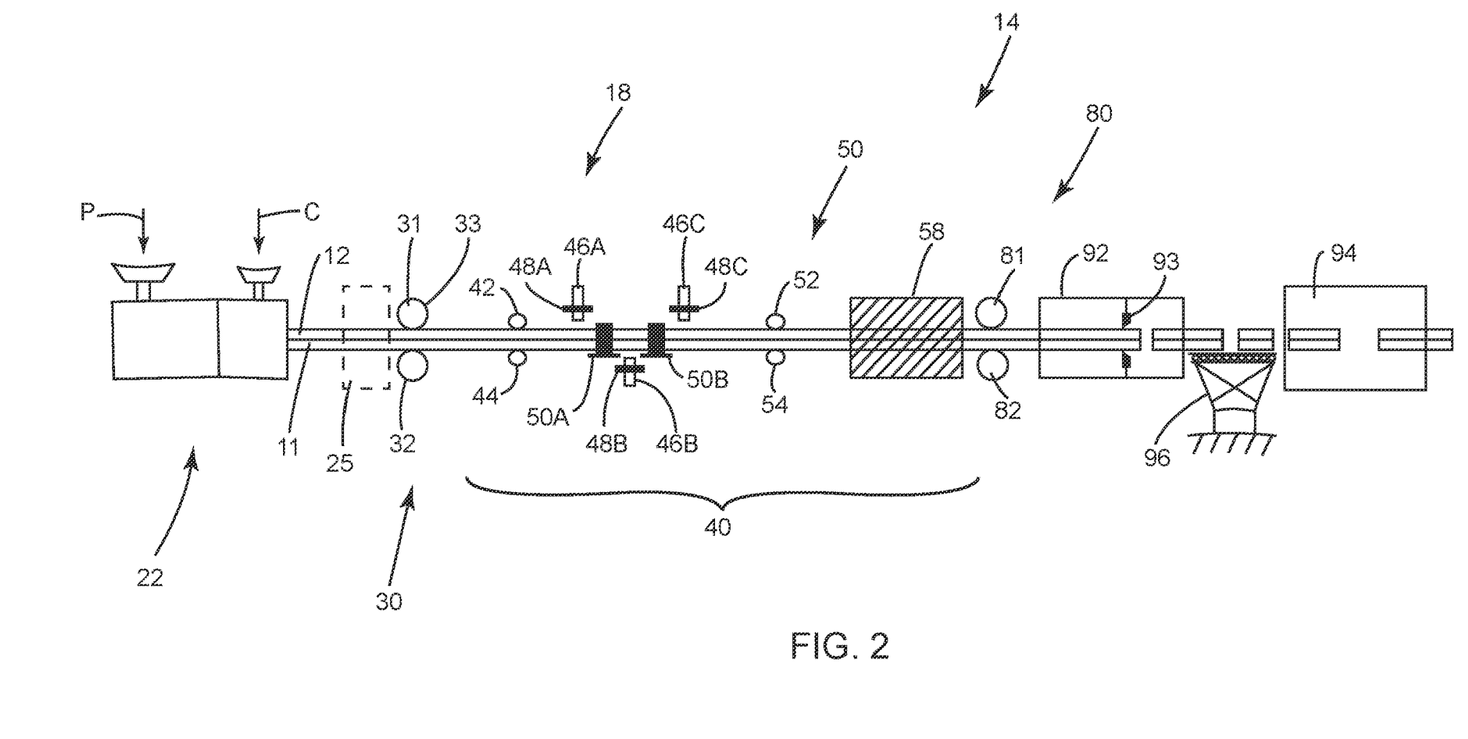
FIG. 2 is a schematic view of the example extrusion and embossing system of the present disclosure.

Referring to FIG. 2, an example system 14, including processes and methods, for manufacturing the composite extruded product 10 is depicted. The system 14 can be carried out in a single processing line to form the complete composite extruded product 10. However, a person having ordinary skill in the art will recognize that the system components and processes described herein can be removed and/or added based on the particular composite extruded product 10 being manufactured. For example, pre-fabricated boards may be inserted into the machine 18 and/or system 14 such that an extruder 22 (described herein) is not included in the system. In another example, a film application section 25 (described further herein) can be included with the machine 18 downstream of the extruder 22 and configured to apply a rolled film product to at least one surface of the composite extruded product 10.

The composite extruded product 10 is formed by an extrusion process in an extrusion machine 18. Extrusion processes are generally well known in the art. For example, the materials to be used to form the composite extruded product 10 are mixed and pelletized. The pellets of the materials are then mixed with various other additives, chemicals, other pellets, and/or the like and formed together (see arrow P) by thermal and/or pressure applications in an extruder 22 such that a homogeneous material is extruded through a forming die to form the substrate 11. For composite extruded product 10 with a cap 12, the cap 12 is formed from desired materials and formed in a similar manner as the substrate 11 (described above and arrow C representing the pelletized cap material entering the extruder 22). The material of the cap 12 is then extruded through the forming die with the substrate 11.

The substrate 11 and the cap 12 are extruded from the extruder 22 and are conveyed to a first embossing section 30 that includes an upper embossing roller 31 configured to emboss the cap 12 (or the upper surface of the substrate 11 if the composite extruded product 10 does not include a cap 12) and an opposing, lower embossing roller 32 configured to support the composite extruded product 10 such that the composite extruded product 10 is subjected to pressure as the cap 12 or the top of the extruded product 10 is embossed. The upper embossing roller 31 includes an embossing surface 33 that contacts the cap 12 and imparts a pattern, e.g. first wood grain pattern, into the cap 12. In certain embodiments, the first embossing section 30 is excluded and the composite extruded product 10 is embossed by a downstream embossing section 80 (described herein, below). In one example, the embossing surface 33 is a primary wood grain pattern having a 40/1000 inch matte finish. The matte finish of the embossing surface 33 embosses tiny bubbles or ovals that increase the overall texture and/or slip resistance of the composite extruded product 10.

A person having ordinary skill in the art will recognize that as the composite extruded product 10 is extruded from the extruder 22, the composite extruded product 10 begins to cool as the composite extruded product 10 is conveyed downstream through various process sections of the extrusion machine 18. It has been determined that the composite extruded product 10 must be maintained at a certain temperature in order for additional, downstream processes to be applied to the composite extruded product 10. Specifically, the temperature of various physical components, e.g. side surface, top surface, center, of the composite extruded product 10 must be maintained at a preselected temperature or temperature range such that when additional, downstream processes are applied to the composite extruded product 10 they are applied in the appropriate temperature range to produce effective products. A person having ordinary skill in the art will recognize that the preselected temperature ranges of the surfaces of the composite extruded product 10 can vary between an upper temperature limit at which the composite extruded product 10 melts and is unworkable and a lower temperature limit at which the composite extruded product 10 is not malleable and is unworkable. Accordingly, the present application includes a temperature control section 40 configured to control the temperature of the composite extruded product 10 (including various surfaces, section, and layers thereof) and/or increase the temperature or reheat various aspects of the composite extruded product 10 such that downstream processes may be applied to the composite extruded product 10 at the preselected temperature range to create the product with the determined qualities disclosed herein The preselected temperature range is a temperature range between 200 degrees Fahrenheit (° F.) and 350° F., and preferably between 260-270° F. at a location downstream of the extruder 22 such that the composite extruded product 10 is properly embossed at the first embossing section 30, properly embossed at a second embossing section 80 (described herein), and/or properly receives a film layer 15 at the film application section 25.

The temperature control section 40 (see also FIG. 3 which is reproduced from above incorporated U.S. Patent Application Publication No. 2011/0203724) includes a first upper pressure roller 42 configured to contact the cap 12 and an opposing, first lower pressure roller 44 configured to contact the lower surface of the substrate 11. The first pair of pressure rollers 42, 44 applies a pressure to the composite extruded product 10 to maintain the desired shape of the composite extruded product 10 and/or prevent the longitudinal center of the composite extruded product 10 from bowing inwardly relative to the longitudinal edges. The pressure rollers 42, 44 are preferably constructed of aluminum, and the pressure rollers 42, 44 operate to cool or heat the cap 12 and the lower surface of the substrate 11 to achieve the desired temperature range. It should be noted that for all temperature control rollers described herein the construction is preferably of aluminum, however other materials such a stainless steel, aluminum alloys, and/or other composites may be used as long as the temperature transfer effect from the rollers to the product described herein is effected. In that regard, the pressure rollers 42, 44 are preferably connected to fluid pumps 62 configured to circulate heated or cooled fluid through the interior of the pressure rollers 42, 44 such that the temperature of the cap 12 and/or the lower surface of the substrate 11 increases or decreases as heat is transferred between the pressure rollers 42, 44 and the cap 12 and/or the lower surface of the substrate 11.

The temperature control section 40 includes a plurality of heaters 46A, 46B, 46C that are configured to heat various surfaces of the composite extruded product 10. Referring the FIG. 3, a first pair of heaters 46A is configured to heat the upper portions of the sides and the upper edges of the composite extruded product 10, a second pair of heaters 46B is configured to heat the lower portions of the sides and the lower edges of the composite extruded product 10, and a third pair of heaters 46B is configured to heat the upper surface of the composite extruded product 10. The number of heaters 46A, 46B, 46C can vary, and the heaters 46A, 46B, 46C can be connected to a heated air source or have heating elements and fans such that heated air is applied to the composite extruded product 10.

Figure 3:
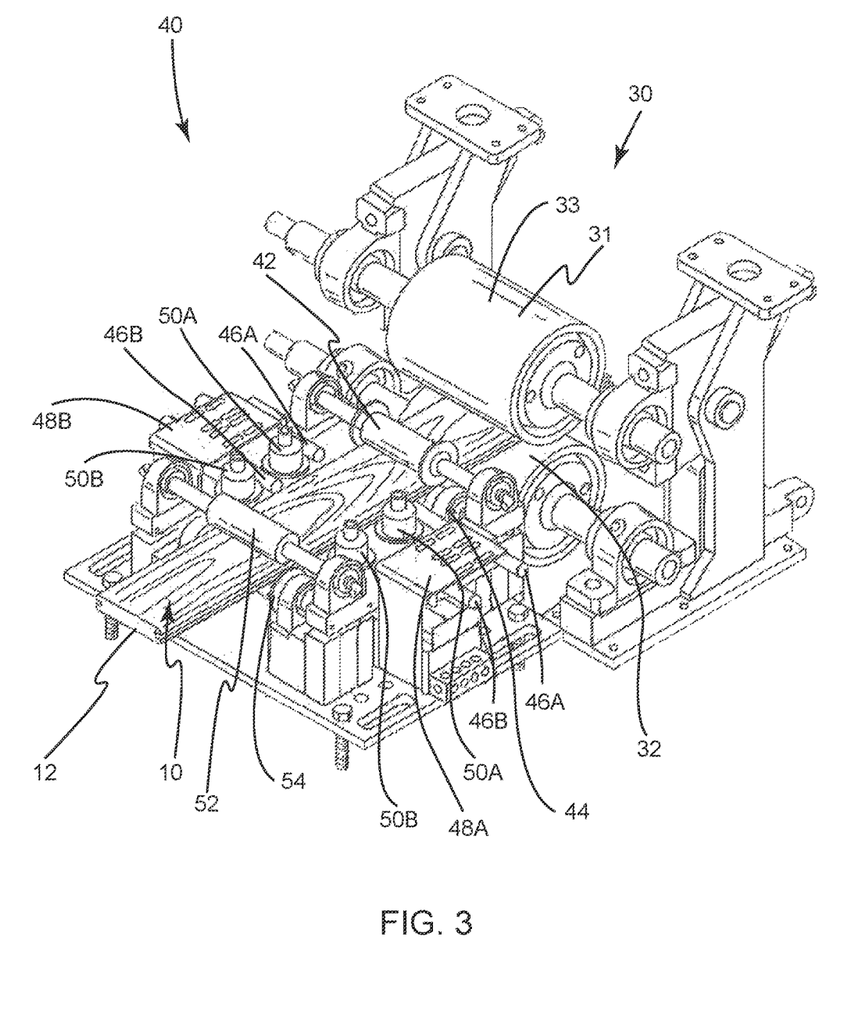
FIG. 3 is a partial view of an example temperature control section.

The first and second pairs of heaters 46A, 46B are movably coupled to a first bracket 48A and a second bracket 48B. The heaters 46A, 46B configured to be slidably movable relative to the brackets 48A, 48B such that the heaters 46A, 46B can be positioned at a desired location relative to the composite extruded product 10 and the surfaces of the composite extruded product 10 can be heated to the preselected temperature. The third pair of heaters 46C are movably coupled to a third bracket 48C, and the heaters 46C configured to be slidably movable relative to the brackets 48C such that the heaters 46C can be positioned at a desired location relative to the composite extruded product 10 such that the surfaces of the composite extruded product 10 can be heated to the preselected temperature.

The temperature control section 40 includes side nip rollers 50A, 50B that positioned on either side of the composite extruded product 10 and configured to contact the composite extruded product 10 to maintain the desired shape of the composite extruded product 10. The side nip rollers 50A, 50B may be constructed of aluminum, and the side nip rollers 50A, 50B operate to cool or heat the composite extruded product 10. The side nip rollers 50A, 50B can be connected to a heated fluid source such that heated fluid is circulated through the side nip rollers 50A, 50B and heat is applied to the composite extruded product 10, as described previously with respect to the pressure rollers 42, 44.

The temperature control section 40 also includes a second upper pressure roller 52 configured to contact the cap 12 and an opposing, second lower pressure roller 54 configured to contact the lower surface of the substrate 11. The second pair of pressure rollers 52, 54 apply a pressure to the composite extruded product 10 to maintain the desired shape of the composite extruded product 10 and/or prevent the longitudinal center of the composite extruded product 10 from bowing vertically downwardly due to gravity. The pressure rollers 52, 54 may be aluminum, and the pressure rollers 52, 54 cool or heat the cap 12 and the lower surface of the substrate 11. The pressure rollers 52, 54 can be connected to a heated fluid source such that heated fluid is circulated through the pressure rollers 52, 54 and heat is applied to the cap 12 and the lower surface of the substrate 11, in the same manner as the pressure rollers 42, 44 and the side nip rollers 50A, 50B.

The temperature control section 40 includes a reheat oven 58 that is configured to receive the composite extruded product 10 and heat the composite extruded product 10 such that the surfaces of the composite extruded product 10 exits the reheat oven 58 at a temperature within the preselected range (as described above).

The temperature control section 40 can include temperature sensors 60 that are configured to sense the temperature of the composite extruded product 10. Specifically, multiple sensors 60 can be used to sense the temperature of different physical components, e.g. side surface, top surface, of the composite extruded product 10. The function of the temperature sensors 60 is described further herein. Any suitable type of temperature sensor can be used (e.g. infrared temperature sensor, thermocouples, resistance temperature detector). The position of the temperature sensors 60 on the machine 18 can vary. In one example, the temperature sensors 60 are positioned at the temperature control section 40 and are configured to senses of temperature of different surfaces of the composite extruded product 10.

Figure 5:
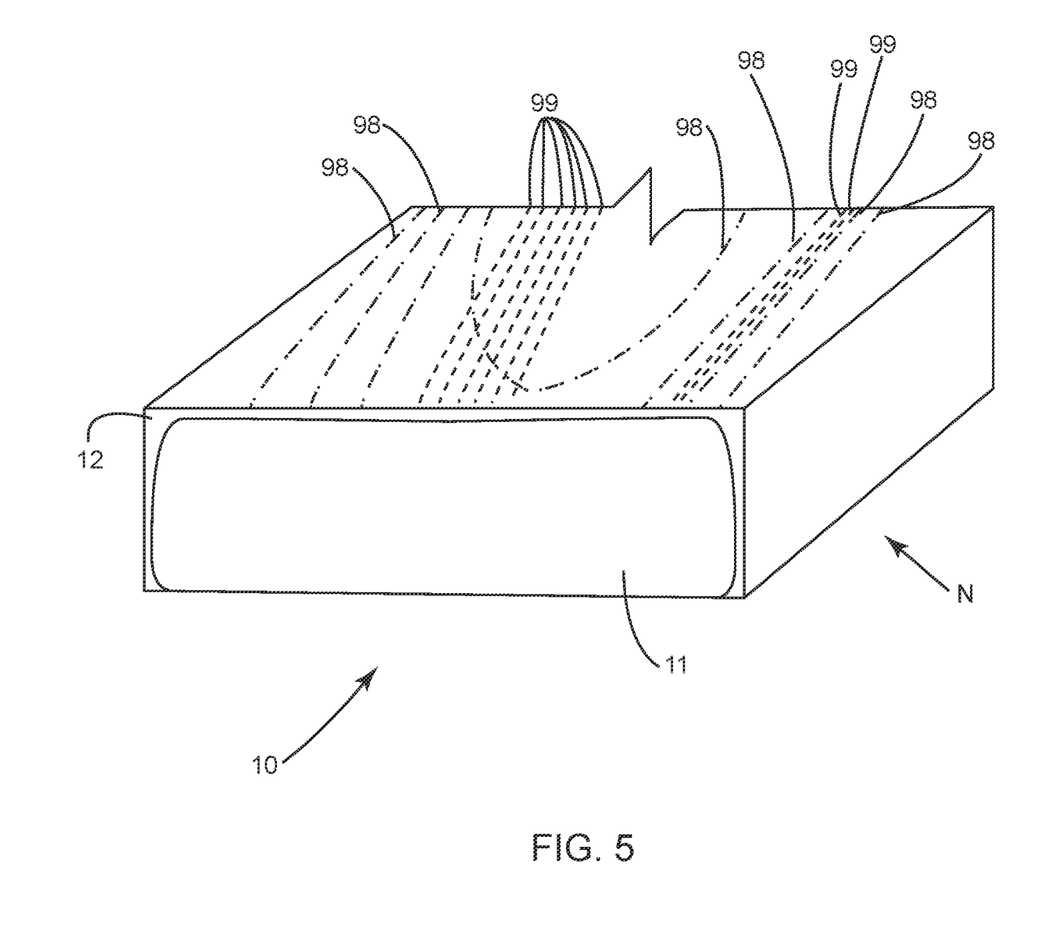
FIG. 5 is an example composite extruded product with a first embossing pattern (depicted as dash-dot-dash lines) and a second embossing pattern (depicted as dash-dash lines) embossed thereon.

The machine 18 includes a second embossing section 80 that includes an upper embossing roller 81 configured to further emboss the cap 12 (or the upper surface of the substrate 11 if the composite extruded product 10 does not include a cap 12) and an opposing, lower embossing roller 82 configured to support the composite extruded product 10 such that the composite extruded product 10 is subjected to pressure as the cap 12 is further embossed. In the example depicted in FIG. 2, the second embossing section 80 is positioned downstream of the temperature control section 40. The upper embossing roller 81 includes an embossing surface 83 that contacts the cap 12 and imparts a pattern, e.g. lateral line pattern, into the cap 12. The present inventor has discovered that embossing the cap 12 a second time downstream of the temperature control section 40 imparts an additional embossing pattern into the cap 12 as compared to conventional machines and systems which can only emboss a single pattern into the cap 12. As such, the composite extruded product 10 includes at least one embossed surface that is embossed twice and the composite extruded product 10 better mimics the wood grain pattern of real wood as compared to conventional composite extruded products that are processed by conventional extrusion and/or embossing processes and/or machines. Furthermore, it has been discovered that embossing the composite extruded product 10 a second embossed pattern with lateral line pattern further increases the texture and slip resistance of the composite extruded product 10. Referring to FIG. 5, an example composite extruded product 10 is shown having the wood grain pattern (see dash-dot-dash lines that are labeled as 98) embossed at the first embossing section 30 and the lateral line pattern (see dash-dash lines that are labeled as 99). It has been determined that controlling the temperature of the composite extruded product 10 as it exits the temperature control section 40 is important for embossing the second embossed pattern into the composite extruded product 10 while not destroying the first embossed pattern. It has also been discovered that the second embossed pattern could not be embossed into the composite extruded product 10 over the top of the first embossed pattern without controlling the temperature of the composite extruded product 10 as described above. Accordingly, maintaining the temperature of the composite extruded product 10 within the preselected temperature range is critical for maintaining the first embossed surface as the composite extruded product is conveyed downstream through various sections of the machine 18 and preventing the second embossing station from destroying the first embossed pattern.

The machine 18 can optionally include additional finishing sections which further process the composite extruded product 10. For example, the machine 18 can include a cutter section 92 having a cutter configured to cut the composite extruded panel into desired lengths. The machine 18 can include a finishing section 94 configured to finish, including polish, the composite extruded product 10. The machine 18 can include a roller conveyor 96 on which the composite extruded product 10 may roll as the composite extruded product 10 is conveyed through the machine 18.

The machine 18 of the present disclosure may also be configured to apply a film layer 15 (see FIG. 1A in which the film layer 15 is depicted in dashed lines; see also film 212 on FIG. 6) to the composite extruded product 10. The film layer 15 is configured to be applied to the composite extruded product 10 after the composite extruded product 10 is extruded from the extruder 22. The film layer 15 includes any suitable material and may include some of the materials described above with reference to the substrate 11 and the cap 12. The film layer 15 is applied to the composite extruded product 10 and the film layer 15 is typically supplied from rollers from a rolled supply roll (not shown). The machine 18 can include additional sections that supply the film layer 15 and/or apply the film layer 15 to the composite extruded product 10. For example, the film layer 15 may be supplied from a rolled film roll (not shown) and applied to the composite extruded product 10 at film application section 25 (depicted in dashed lines on FIG. 2). The film application section 25 included a series of rollers (e.g. top surface roller, bottom surface side surface roller, side nip rollers, inter groove rollers, bottom radius roller) that are configured to fold and/or press the film layer 15 onto the exact shape of the composite extruded product 10. The size, shape, and/or number of rollers can vary based on the shape and/or size of the composite extruded product 10. The present inventor has determined that the temperature of the film layer 15 should be within the preselected temperature range (as described above) to ensure proper pliability and cohesion of the film layer 15 to the substrate 11 or cap 12. In certain examples, the preselected temperature range is in the range of 260-270° F.

Figure 4:
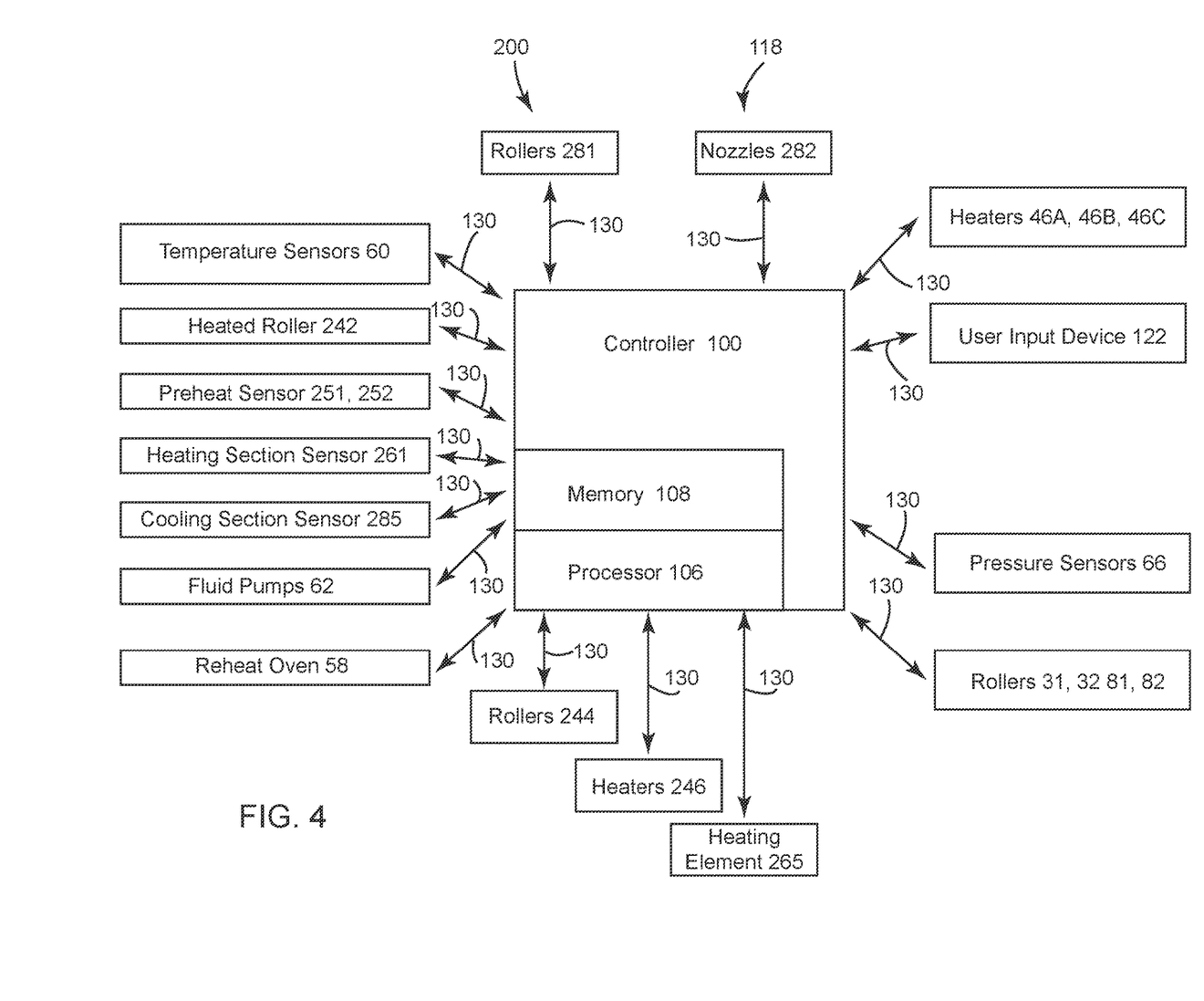
FIG. 4 is an example computing system of the present disclosure.

Referring to FIG. 4, the machine 18 includes a controller 100 that is configured to control reheat oven 58 and other components thereof. The controller 100 is part of a computing system 118 included with the machine 18. The computing system 118 includes a user input device 122 that allows the operator to input information into the computing system 118 to control the machine 18 and components thereof.

The controller 100 includes a processor 106 and a memory 108. The processor 106 loads and executes software from the memory 108. When executed by the controller 100, the software directs the processor 106 to operate to carry out the methods described herein.

The processor 106 can comprise a microprocessor and other circuitry that retrieves and executes software from memory 108. The processor 106 can be implemented within a single processing device but can also be distributed across multiple processing devices or sub-systems that cooperate in existing program instructions.

The memory 108 can comprise any storage media readable by the processor 106 and capable of storing software. The memory 108 can include volatile and non-volatile, removable and non-removable media implemented in any method or technology for storage of information, such as computer readable instructions, data structures, program modules, or other data. The memory 108 can be implemented as a single storage device but may also be implemented across multiple storage devices or sub-systems. The memory 108 can further include additional elements, such as a controller, capable of communicating with the processor 106.

The user input device 122 can include a mouse, a keyboard, a voice input device, a touch input device, a motion input device, and other comparable input devices and associated processing elements capable of receiving user input from a user or operator. Output devices such as a video display or graphical display can display an interface further associated with embodiments of the system and methods as disclosed herein. Speakers, printers, bells and other types of output devices may also be included in the user input device 122. The user input device 122 may display the computing system 118 on a display screen, and/or may announce it via a speaker.

In certain examples, the controller is configured to control the reheat oven 58, the fluid pumps 62, and the heaters 46A, 46B, 46C via wired or wireless communication links 130 such that the temperature of the composite extruded product 10 is maintained within a predetermined range of temperatures for the double embossing process described above. The controller 100 is in communication with the temperature sensors 60, and based on the desired temperature(s) and the temperature sensed by the temperature sensors 60, the controller 100 controls the reheat oven 58, the fluid pumps 62, and/or the heaters 46A, 46B, 46C. For example, if the temperature sensors 60 sense that the composite extruded product 10 or surfaces thereof exiting the first embossing section 30 is less than the desired preselected temperature range that is entered into the memory 108, the controller 100 controls the reheat oven 58, the fluid pumps 62, and/or the heaters 46A, 46B, 46C to increase the amount of heat applied to the composite extruded product 10 thereby raising the temperature of the surfaces of the composite extruded product 10 within the preselected temperature range.

In other examples, the controller 100 is configured to control the pressure exerted by the upper and lower rollers 31, 32 at the first embossing section 30 and/or the upper and lower rollers 81, 82 at the second embossing section 80. Pressure sensors 66 are coupled to the rollers 31, 32, 81, 82 and are configured to sensor the pressure applied to the composite extruded product 10. The pressure sensors 66 are in communication with the controller 100, and the controller is configured to control the rollers 31, 32, 81, 82 such that the pressure applied by the rollers 31, 32, 81, 82 to the composite extruded product 10 is at a preselected pressure required to impart the embossed pattern(s) into the composite extruded product 10. Any suitable pressure sensor can be utilized.

Figure 6:
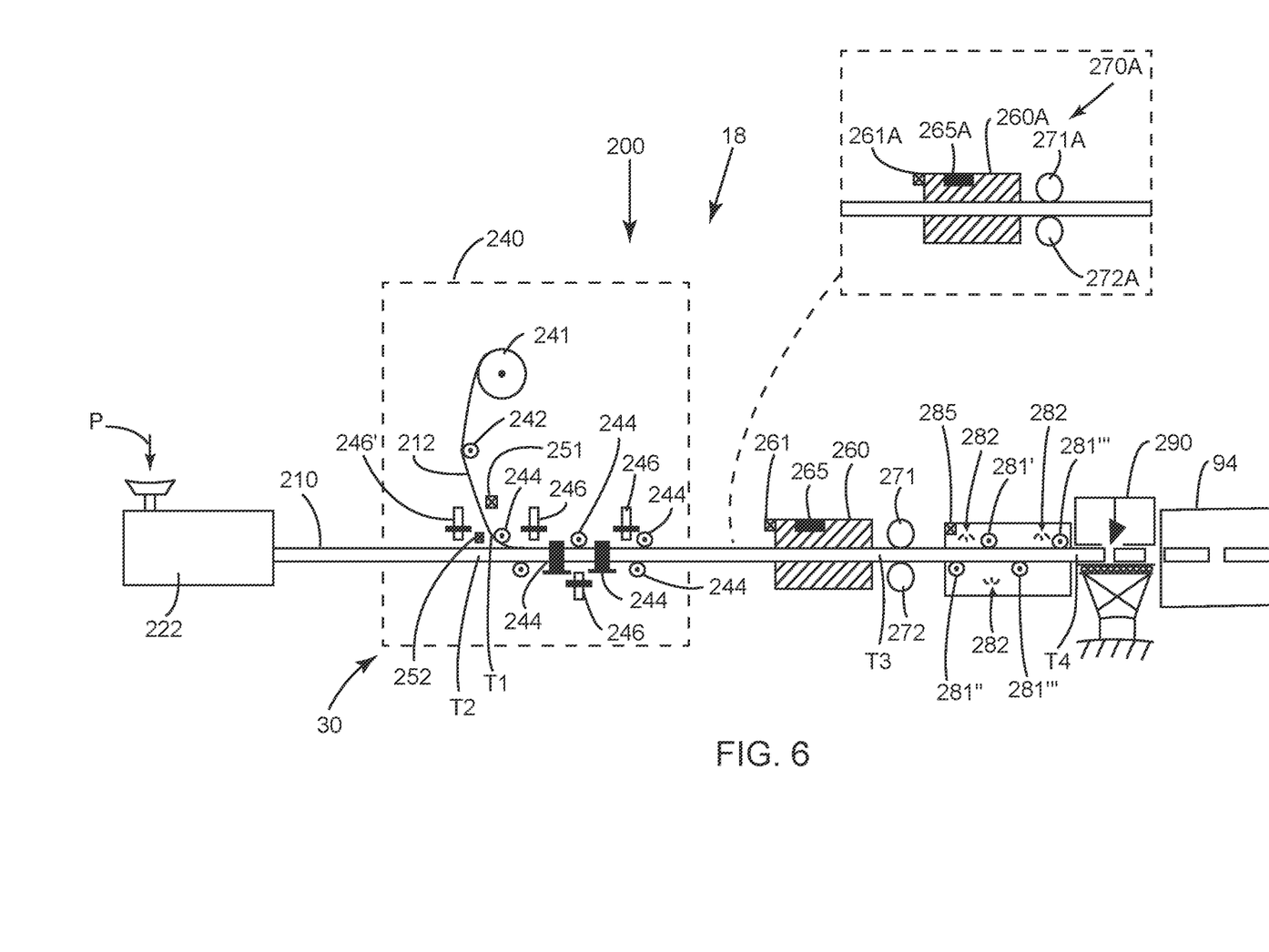
FIG. 6 is a schematic view of another example extrusion and embossing system of the present disclosure.
Figure 7:
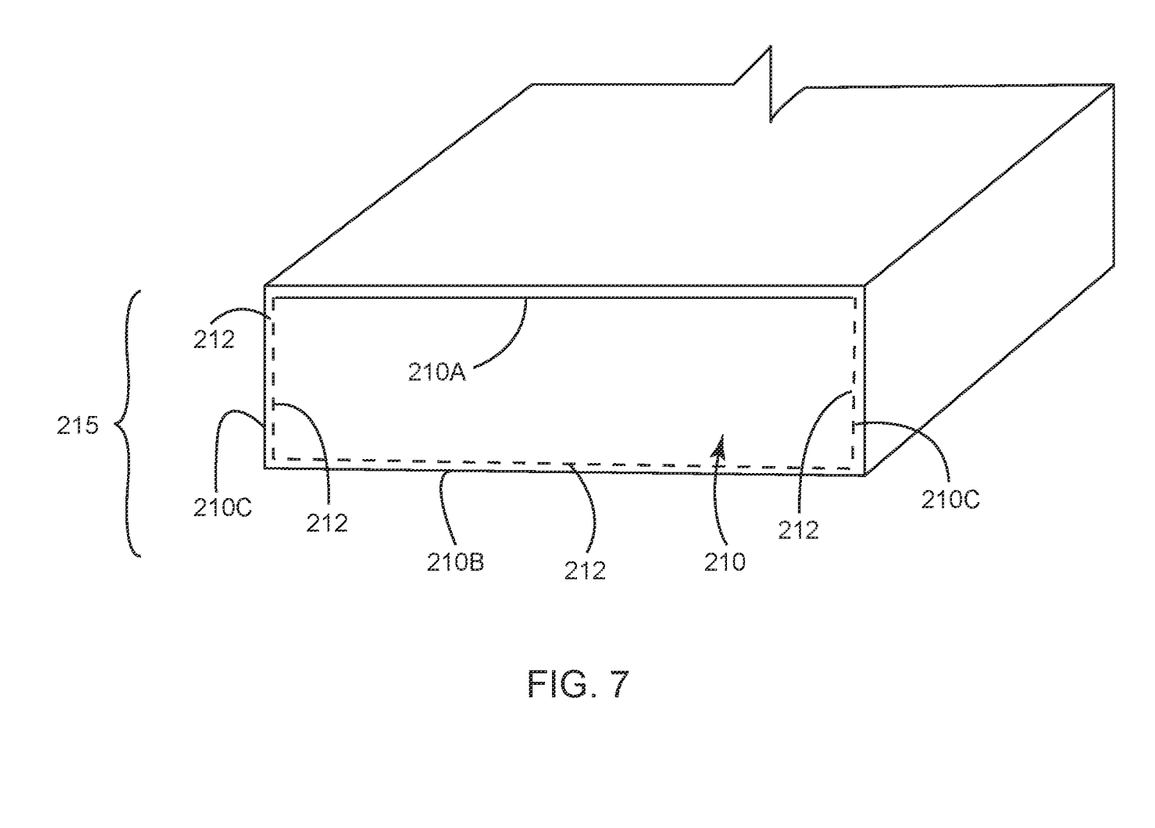
FIG. 7 is an example composite extruded product having a substrate and an integrally bonded film.

Now referring to FIGS. 6-7, another example extrusion and embossing system 200 of the present disclosure is depicted. In this example, a composite extruded product 215 is formed with a substrate 210 and a film 212 (see FIG. 7). The substrate 210 may be extruded with or without a cap (as described above). The system 200 includes an extruder 222 similar to the extruder 22 described above with reference to FIG. 2. The extruder 222 continuously extrudes the substrate 210 downstream. In the example where the substrate 210 is extruded without a cap, the cross-section of the substrate 210 is homogeneous. It is also contemplated that certain example systems 200 may exclude the extruder 222 and the substrate 210 may be loaded or fed into the system by hand or another machine.

The substrate 210 may be continuously extruded from the extruder 222 to form a substrate having a top surface 210A, a bottom surface 210B, and opposing side surfaces 210C, as shown in FIG. 7. The substrate 210 is received from the extruder 222 into a film application section 240 where the film 212 is applied to the substrate 210 such that the film 212 is integrally bonded with the substrate 210. Once the film 212 is integrally bonded to the substrate 210, the composite extruded product 215 is formed. The composite extruded product 215 may be formed when the film 212 is integrally bonded to at least the top surface 210A of the substrate 210. However, in certain embodiments the film 212 is integrally bonded with additional surfaces if the substrate 210, including, but not limited to the opposing side surfaces 210C and/or the bottom surface 210B. Each surface of the substrate 210 that receives the film 212 is herein referenced to as a film application surface. In the example depicted in FIG. 7, the inner edges of the film 212 is depicted in solid lines along the top surface 210A of the substrate 210. The film 212 can also be applied to the side surfaces 210C and/or the bottom surface 210B, the inner edges of which are depicted in dashed lines.

The film application section 240 includes a supply roll 241 of the film 212 and a heated roller 242 that tensions the film 212 and heats the film 212 to a first preheat temperature T1, preferably in a range between 275° F. and 325° F., such that the film 212 is malleable when the film application section 240 applies the film 212 to the film application surface(s) of the substrate 210. The film application section 240 has a plurality of rollers 244 that press the film 212 onto the film application surfaces of the substrate 210 to form the composite extruded product 215.

The film application section 240 also has a plurality of heaters 246 that heat different sections or surfaces of the substrate 210 before, during, and/or after the film 212 is applied or pressed into contact with the substrate 210. In one example, a first heater 246' heats at least one film application surface to a second preheat temperature T2, preferably in a range between 250° F. and 275° F., that approximates or is less than the first preheat temperature. This preheating occurs before the rollers 244 press the film 212 onto the film application surface. In another example, one of the heaters 246 heats one film application surface before one of the rollers 244 presses the film 212 onto the film application surface and another heater 246 heats another film application surface of the composite extruded product 215 before a different roller 244 presses the film onto this other film application surface. The film application section 240 also includes one or more temperature sensors (e.g. first temperature sensor 251, second temperature sensors 252) configured to sense the temperature of the film 212 and/or the substrate 210 before the film 212 is pressed into contact with the film application surfaces of the substrate 210. The operation and function of the temperature sensors 251, 252 is described further herein.

The composite extruded product 215, which now comprises at least one surface including the integrally bonded film 212 to the substrate 210 defining a first embossing surface (e.g. the top surface, the bottom surface, or one of the side surfaces) is dispensed from the film application section 240 and further conveyed downstream to a heating section 260. The heating section 260 receives the composite extruded product 215 from the film application section 240 and heats the composite extruded product 215 with a heating element 265. The heating element 265 may include a heating coil, gas heater, infrared heater, or any other element for heating or increasing the temperature of the composite extruded product 215. As such, the composite extruded product 215 is dispensed from the heating section 260 at a preselected embossing temperature T3, preferably in a temperature range between 250° F. and 275° F. In certain examples, the temperature of the composite extruded product 215 upstream of the heating section 260 is less than the embossing temperature T3. The heating section 260 includes a heating section sensor 261 (e.g. temperature sensor) configured to sense the temperature of the composite extruded product 215 received into the heating section 260, and the sensor 261 provides feedback, e.g. signals, to the controller 100, as described herein, and the controller 100 controls the heating section 260 and/or the heating element 265 to apply an appropriate amount of heat such that the composite extruded product 215 is heated to the embossing temperature T3.

The composite extruded product 215 is then conveyed to an embossing section 270 that receives the composite extruded product 215 from the heating section 260 and embosses a pattern into the first embossing surface. The embossing section 270 has a first embossing roller 271 and a second embossing roller 272. In certain examples, the first embossing roller 271 embosses the first embossing surface with a wood-grain pattern. The embossing section 270 is similar to the embossing section 30 described above with respect to FIG. 2. In certain alternative embodiments, the embossing system may include a temperature control section 40 and a second embossing section 80 as described with respect to FIG. 2. The temperature control section 40 may be incorporated downstream of embossing section 270 and includes a reheat oven 58 that is configured to receive the embossed composite extruded product 215 and heat the composite extruded product 215 such that the surfaces of the composite extruded product 215 exits the reheat oven 58 at a temperature within the preselected embossing range. The composite extruded product 215 may then travel to the second embossing section 80 that includes an upper embossing roller 81 configured to further emboss the composite extruded product 215 and an opposing, lower embossing roller 82 configured to support the composite extruded product 215 such that the composite extruded product 215 is subjected to pressure as it is further embossed as described above.

After the composite extruded product 215 is embossed, the composite extruded product 215 is conveyed to a cooling section 280 that receives the embossed composite extruded product 215 from the embossing section 270, applies pressure to the embossed composite extruded product 215, and sprays cooling fluid onto the embossed composite extruded product 215 to thereby cool the composite extruded product 215 to a cooled temperature T4 that is less than the embossing temperature T3. As the composite extruded product 215 is cooled, the pattern embossed into the embossing surface(s) permanently set.

The cooling section 280 has a plurality of cooling rollers 281 that apply pressure to the composite extruded product 215 to thereby maintain the composite extruded product 215 in a desired shape as it is cooled in the cooling section 280. In certain examples, cooling fluid may be conveyed through the cooling rollers 281 to thereby cool the cooling rollers 281 and the composite extruded product 215. In one example, a first cooling roller 281' applies a first pressure to the first embossing surface and a second cooling roller 281" applies a second pressure to the bottom surface. In other examples, downstream cooling rollers 281''' apply pressure(s) to the composite extruded product 215 that are less than the pressures applied by the first and second cooling rollers 281', 281". As such, the pressure applied to the composite extruded product 215 gradually decreases as the composite extruded product 215 is conveyed downstream through the cooling section 280. The cooling section 280 has a cooling section sensor 285 (e.g. temperature sensor) configured to sense the temperature of the composite extruded product 215 received into the cooling section 280 and provide feedback to the controller 100, as described herein. As will be described further herein, the controller 100 controls the cooling rollers 281 to apply an appropriate amount of pressure to the composite extruded product 215.

The cooling section 280 has a plurality of nozzles 282 that spray the cooling fluid onto the composite extruded product 215 to thereby cool the composite extruded product 215. The nozzles 282 can include valves (not shown) that automatically or manually open and close, and the nozzles 282 are connected to a pump (not shown) or pressurized cooling fluid tank (not shown) from which the cooling fluid is conveyed to the nozzles 282. The nozzles 282 spray the cooling liquid onto the composite extruded product 215 as the pressure rollers 281 apply pressure and maintain the desired shape of the composite extruded product 215. The cooling fluid cools the composite extruded product 215 to a cooled temperature T4. In certain examples, a first nozzle 282' sprays cooling fluid onto the first embossing surface of the composite extruded product 215 and a second nozzle 282" sprays cooling fluid onto the bottom surface of the composite extruded product 215.

The composite extruded product 215 is conveyed to a cutter section 290 where the composite extruded product 215 is cut to a desired length. The cutter section 290 is similar to the cutter section 92 described above. A finishing section 294 configured to finish the composite extruded product 215.

Referring back to FIG. 4, the system 200 may include the controller 100 depicted. The controller 100 is in communication with and controls various components of the system 200. For example, the controller in communication with the heating section sensor 261, the heating element 265, the cooling section sensor 285, the cooling rollers 281, and nozzles 282. The controller 100 controls the heating element 265 based on feedback received from the heating section sensor 261 and can thereby heat the composite extruded product 215 to the embossing temperature T3 before the pattern is embossed into the composite extruded product 215 at the embossing section 270. The controller 100 also controls the nozzles 282 based on feedback from the cooling section sensor 285. As such, the controller 100 can control the nozzles 282 to selectively spray cooling fluid onto the composite extruded product 215 to cool, e.g. reduce the temperature, the composite extruded product 215 to the cooled temperature T4 (which is less than the embossing temperature T3). A person of ordinary skill in the art will recognize the controller 100 may further control the pump or cooling fluid source connected to the nozzle 282 such that the cooling fluid sprays from the nozzle 282.

The controller 100 also controls the cooling rollers 281 based on feedback from the cooling section sensor 285. As such, the controller 100 controls the cooling roller 281 to apply pressure to the composite extruded product 215 as the composite extruded product 215 is cooled to the cooled temperature T4. A person of ordinary skill in the art will recognize that the cooling roller 281 may apply pressure to the composite extruded product 215 in any suitable manner and the cooling roller 281 may be connected to activation system, e.g. a pneumatic system, that causes the cooling roller 281 to move and apply different pressures to the composite extruded product 215. In other examples, the cooling roller 281 may also be manually moved to thereby vary the pressure applied to the composite extruded product 215. In certain examples, downstream cooling rollers 281 apply less pressure to the composite extruded product 215 than upstream cooling rollers 281. In certain examples, the cooling section 280 includes pressure sensors (see pressure sensors 66 on FIG. 4) which sense pressure and are in communication with the controller 100. The controller 100 is further configured to change the pressure applied by the cooling rollers 281 based on feedback from the pressure sensors 66.

The controller 100 is also in communication the heated roller 242 and the first temperature sensor 251, and the controller 100 controls the heated roller 242 based on feedback from the first temperature sensor 251. In particular, the controller 100 controls the heated roller 242 to apply an appropriate amount of heat to the film 212 that will increase the temperature of the film 212 to the first preheat temperature T1. The controller 100 is also in communication with the second temperature sensor 252 that senses the temperature of the substrate 210. The controller 100 is configured to control the heater 246 based on feedback from the second temperature sensor 252 and thereby apply an appropriate amount of heat to the substrate to increase the temperature of the substrate 210 to the second preheat temperature T2. In certain examples, the first preheat temperature T1 is more than the second preheat temperature T2. In certain examples, the first preheat temperature T1 is between 275° F. and 235° F. and the second preheat temperature is between 250° F. and 275° F.

Accordingly, systems 14, 200 for manufacturing an embossed composite extruded product are disclosed. In one example shown in FIGS. 6 and 7, the system 200 contemplates obtaining a substrate 210 formed of a composite material and having a top surface 210A, a bottom surface 201B, and opposing side surfaces 210C and providing the substrate 210 to a film application section 240. In certain embodiments, the substrate 210 is loaded or fed into the system 200 by hand or another machine, while in the embedment shown in FIG. 6, an extruder 222 is configured to continuously extrude and convey the substrate 210 downstream to the film application section 240.

The film application section 240 receives the substrate 210 and applies a film 212 to the substrate 210 such that the film 212 is integrally bonded with at least one surface 210A, 210B and/or 210C of the substrate 210. In one example the surface is the top surface 201A. In other examples, the film 212 is bonded to top surface 210A and side surfaces 210C. In still other examples, the film is bonded to all surfaces 210A, 210B and 210C of the substrate 210, as shown in FIG. 7 (note that the edges of the film 212 is shown in solid and dashed lines as described above). It will be recognized to one of ordinary skill in the art that one or multiple surfaces may have the film 212 applied thereto within the system 200. The substrate 210 and the film 212 form a composite extruded product 215 and the composite extruded product 215 thus formed has a first embossing surface that is defined as at least one of the top surface 210A, the bottom surface 210B, and the side surfaces 210C of the substrate 210 with the integrally bonded film 212 bonded thereto. In certain examples, the film application section 240 has a plurality of rollers 244 that press the film 212 onto at least one of the top surface 210A, the bottom surface 210B, or a side surface 210C of the substrate. The film application section 240 may also include a first heater 246 that heats the one of the top surface 210A, the bottom surface 210B, or one side surface 210C of the substrate 210 before one roller of the plurality of rollers 244 presses the film 212 thereon. Additional heaters 246 may also be incorporated to heat another of the top surface 210A, the bottom surface 210B, or one side surfaces 210C not already heated before another roller of the plurality of rollers 244 presses the film 212 thereon. The system 200 may also include a heated roller 242 positioned upstream of the at least one heater 246 and the plurality of rollers 244 for heating the film 212 such that the film is malleable when the film 212 is applied to the substrate 210.

At least one heating section 260 is integrated into the system 200 downstream if the film application section 240. The heating section 260 receives the composite extruded product 215 after film application and increases a temperature of the composite extruded product 215 to an embossing temperature. At least one embossing section 270 receives the composite extruded product from one heating section 260 and embosses a pattern 98, 99 into the first embossing surface to provide an embossed composite extruded product, e.g. product 10 as shown in FIG. 5. As shown in FIG. 6, in certain examples of the system 200, two or more heating sections 260, 260A and embossing section 270, 270A sections are contemplated such that the composite extruded product 215 is heated at a first heating section 260A, embossed at a first embossing section 270A, then heated at a second heating section 260 and then embossed a second time at a second embossing section 270. Additional heating and embossing sections may be incorporated into the system, with the only limitation being the desired number of embossments for a given composite extruded product 215. After embossing is completed, a cooling section 280 receives the embossed composite extruded product, applies pressure to the embossed composite extruded product, and sprays cooling fluid onto the embossed composite extruded product 215. This results in the embossed composite extruded product 215 being cooled to a cooled temperature that is less than the embossing temperature and permanently setting the pattern 98, 99 embossed into the first embossing surface.

In other examples, the cooling section 280 includes at least one cooling section sensor 285, at least one cooling roller 281 for applying pressure to the embossed composite extruded product 215, and at least one nozzle 282 for spraying cooling fluid onto the embossed composite extruded product 215. The cooling section 280, in certain examples, may have a plurality of cooling rollers 281 that apply pressure to the composite extruded product 215 to maintain the composite extruded product 215 at a desired shape as the composite extruded product 215 is cooled to the cooled temperature. The cooling section 280 may also have a plurality of nozzles 282 that spray the cooling fluid onto the embossing surface of the composite extruded product 215 to cool the composite extruded product as the plurality of pressure rollers 281 applies pressure to the embossed composite extruded product 215.

In certain examples, a controller 100 is in communication with at least one temperature sensor 251 for sensing the temperature of the composite extruded product 215 upstream of each heating section 260. The temperature sensors 251, 252 upstream of a heating section 260 provides feedback to the controller 100 to control each heating section 260 to apply an appropriate amount of heat such that the composite extruded product 215 is heated to the embossing temperature. When the cooling section 280 includes at least one cooling section sensor 285, at least one cooling roller 281 for applying pressure to the embossed composite extruded product 215, and at least one nozzle 282 for spraying cooling fluid onto the embossed composite extruded product 215, the controller 100 may be configured to be in communication with each cooling section sensor 285, each cooling roller 281, and each nozzle 282 to receive feedback from each cooling section sensor 285 to control each nozzle 282 to spray the cooling fluid onto the embossed composite extruded product 215 and decrease the temperature of the embossed composite extruded product 215 to a cooled temperature that is less than the embossing temperature and to control each cooling roller 281 to apply pressure to the composite extruded product 215 to maintain a desired shape of the composite extruded product 215.

In certain examples, the composite extruded product 215 has a second embossing surface comprising the substrate and the integrally bonded film located opposite or transverse to the first embossing surface. In this instance, at least one nozzle 282 of the plurality of nozzles 282 sprays cooling fluid onto the second embossing surface.

In another example, a system 200 for manufacturing an embossed composite extruded product 10, 215 formed of a substrate 210 and a film 212 includes an extruder 222 configured to continuously extrude and convey the substrate 210 downstream within the system 200 and forms a substrate 210 having a top surface 210A, a bottom surface 210B, and opposing side surfaces 210C from a composite material. A film application section 240 subsequently receives the substrate 210 from the extruder 222 and applies a film 212 to the substrate 210 such that the film 212 is integrally bonded with the substrate 210. The substrate 210 and the film 212 form a composite extruded product 215 having a first embossing surface defined as the substrate 210 and the integrally bonded film 212 as shown in FIG. 7. In certain examples, the film application section 240 further includes at least one heated roller 242 for heating the film before the film 212 is applied to the substrate 210 and a first temperature sensor 251 for sensing temperature of the film 212. In this instance, the first temperature sensor 251 provides feedback to a controller 100 to control the heated roller 242 to apply an appropriate amount of heat to the film 212 such that the film 212 is heated to a first preheat temperature. The film application section 240 may further include at least one heater 246 for heating the substrate 210 before the film 212 is applied to the substrate 210 and a second temperature sensor 252 for sensing temperature of the substrate 210. Here, the second temperature sensor 252 provides feedback to the controller 100 to control a heater 246 to apply an appropriate amount of heat to the substrate 210 such that the substrate 210 is heated to a second preheat temperature. The first preheat temperature is preferably more than the second preheat temperature, and in certain examples the first preheat temperature is between 275° F. and 325° F. and the second preheat temperature is between 250° F. and 275° F.

The system 200 then may incorporate a heating section 260 that receives the composite extruded product 215 from the film application section 240. Multiple heating sections 260, 260A may be incorporated, as disclosed herein, and each heating section 260, 260A has at least one sensor 261 for sensing temperature of the composite extruded product 215 received into a heating section 260 and at least one heating element 265 for heating the composite extruded product 215 to an embossing temperature. An embossing section 270 subsequently receives the composite extruded product 215 from a heating section 260 and embosses a pattern 98, 99 into the first embossing surface to create an embossed composite extruded product. Again, multiple embossing sections 270, 270A may be incorporated into the system 200 such that the product may receive multiple and varying embossments. What is important is that each embossing sections 270, 270A receives the product 215 from a heating section 260, 260A so that the product 215 is received into the embossing section 270, 270A at the embossing temperature. In certain examples, the embossing temperature is between 250 degrees Fahrenheit (° F.) and 275° F.

A cooling section 280 receives the final embossed composite extruded product 215 from the last embossing section 270. The cooling section 280 has at least one cooling section sensor 285 for sensing temperature of the embossed composite extruded product 215 received into the cooling section 280. A first cooling roller 281' is also incorporated for applying a pressure to the embossed composite extruded product, and a first nozzle 282 for spraying cooling fluid onto the embossed composite extruded product 215 is also utilized. The cooling section 280 may have a second cooling roller 281" positioned downstream of the first cooling roller 281' for applying pressure to the composite extruded product 215. The composite extruded product 215 may have a second embossing surface comprised of the substrate 210 and the integrally bonded film 212. In this instance, one of the first cooling roller 281' and the second cooling roller 281" contacts the first embossing surface and the other of the first cooling roller 281' and the second cooling roller 281" contacts the second embossing surface. The cooling section 280, in this instance, will have a second nozzle 282, and the system is configured such that the first nozzle 282 sprays the cooling fluid onto the first embossing surface and the second nozzle 282 sprays the cooling fluid onto the second embossing surface.

A controller 100 is in communication with each heating section sensor 261, each heating element 265, each cooling section sensor 285, each cooling roller 281, and each cooling nozzle 282. The controller 100 is configured to receive feedback from at least one heating section sensor 261 and control at least one heating element 265 to apply an appropriate amount of heat to the composite extruded product 215 in the heating section 260 to heat the composite extruded product 215 to the embossing temperature. The controller 100 also receives feedback from at least one cooling section sensor 285 to control a first nozzle 282 to spray the cooling fluid onto the embossed composite extruded product 215 and decrease the temperature of the embossed composite extruded product 215 to a cooled temperature that is less than the embossing temperature. The controller 100 further controls the first cooling roller 281' and/or the second cooling roller 281" to apply pressure to the composite extruded product 215 to maintain a desired shape of the composite extruded product 215. In certain examples, the pressure applied by the second cooling roller 281" is less than the pressure applied by the first cooling roller 281'.

In the present description, certain terms have been used for brevity, clarity, and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives and modifications are possible within the scope of the appended claims.

What is claimed is:

1. A system for manufacturing an embossed composite extruded product formed of a substrate and a film, the system comprising:
   an extruder configured to continuously extrude and convey the substrate downstream, the substrate formed of a composite material and having a top surface, a bottom surface, and opposing side surfaces;
   a film application section receiving the substrate from the extruder and applying the film to the substrate such that the film is integrally bonded with the substrate, the substrate and the film forming a composite extruded product having a first embossing surface comprising the substrate and the integrally bonded film;
   at least one heating section receiving the composite extruded product from the film application section, each heating section having at least one heating section sensor for sensing temperature of the composite extruded product received into the heating section and at least one heating element for heating the composite extruded product to an embossing temperature;
   at least one embossing section receiving the composite extruded product from a heating section and embossing a pattern into the first embossing surface to create an embossed composite extruded product;

a cooling section receiving the embossed composite extruded product, the cooling section having at least one cooling section sensor for sensing temperature of the embossed composite extruded product received into the cooling section, a first cooling roller for applying a pressure to the embossed composite extruded product, and a first nozzle for spraying cooling fluid onto the embossed composite extruded product; and a controller in communication with at least one heating section sensor, at least one heating element, at least one cooling section sensor, the first cooling roller, and the first nozzle, wherein the controller is configured to receive feedback from at least one heating section sensor and control at least one heating element to apply an appropriate amount of heat to the composite extruded product in the heating section to heat the composite extruded product to the embossing temperature, and wherein the controller receives feedback from at least one cooling section sensor to control the first nozzle to spray the cooling fluid onto the embossed composite extruded product and decrease the temperature of the embossed composite extruded product to a cooled temperature that is less than the embossing temperature and further control the first cooling roller to apply pressure to the embossed composite extruded product to maintain a desired shape of the embossed composite extruded product; and wherein the cooling section has a second cooling roller for applying pressure to the embossed composite extruded product, the second cooling roller is positioned downstream of the first cooling roller; and wherein the controller is in communication with the second cooling roller and is configured to control the second cooling roller to apply a pressure to the embossed composite extruded product, and wherein the pressure applied by the second cooling roller is less than the pressure applied by the first cooling roller.

2. The system according to claim 1, wherein the composite extruded product has a second embossing surface comprising the substrate and the integrally bonded film, and wherein one of the first cooling roller and the second cooling roller contacts the first embossing surface and the other of the first cooling roller and the second cooling roller contacts the second embossing surface.

3. The system according to claim 2, wherein the cooling section has a second nozzle, and wherein the first nozzle is configured to spray the cooling fluid onto the first embossing surface and the second nozzle is configured to spray the cooling fluid onto the second embossing surface.

4. The system according to claim 2, wherein the film application section further comprises at least one heated roller for heating the film before the film is applied to the substrate and a first temperature sensor for sensing temperature of the film, and wherein the first temperature sensor provides feedback to the controller to control the heated roller to apply an appropriate amount of heat to the film such that the film is heated to a first preheat temperature.

5. The system according to claim 4, wherein the film application section further comprises a heater for heating the substrate before the film is applied to the substrate and a second temperature sensor for sensing temperature of the substrate; and wherein the second temperature sensor provides feedback to the controller to control the heater to apply an appropriate amount of heat to the substrate such that the substrate is heated to a second preheat temperature.

6. The system according to claim 5, wherein the first preheat temperature is more than the second preheat temperature.

7. The system according to claim 6, wherein the first preheat temperature is between 275 degrees Fahrenheit and 325 degrees Fahrenheit and the second preheat temperature is between 250 degrees Fahrenheit and 275 degrees Fahrenheit.

* * * * *